F. W. GARRETT.
CHUCKING MECHANISM FOR MACHINE TOOLS.
APPLICATION FILED APR. 8, 1914.
1,124,008.
Patented Jan. 5, 1915.
3 SHEETS—SHEET 1.
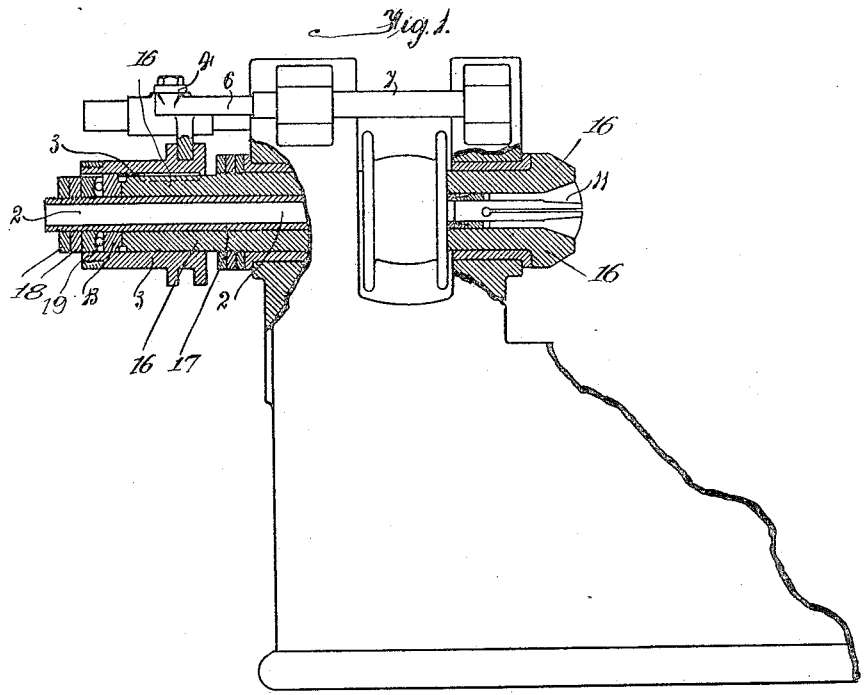
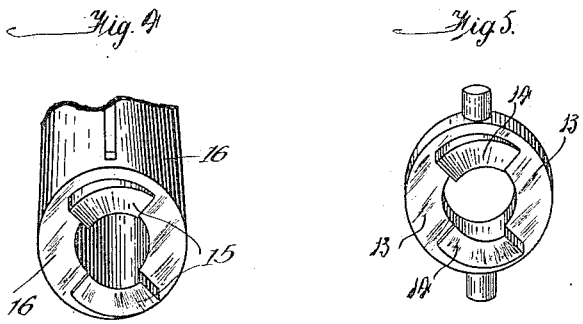

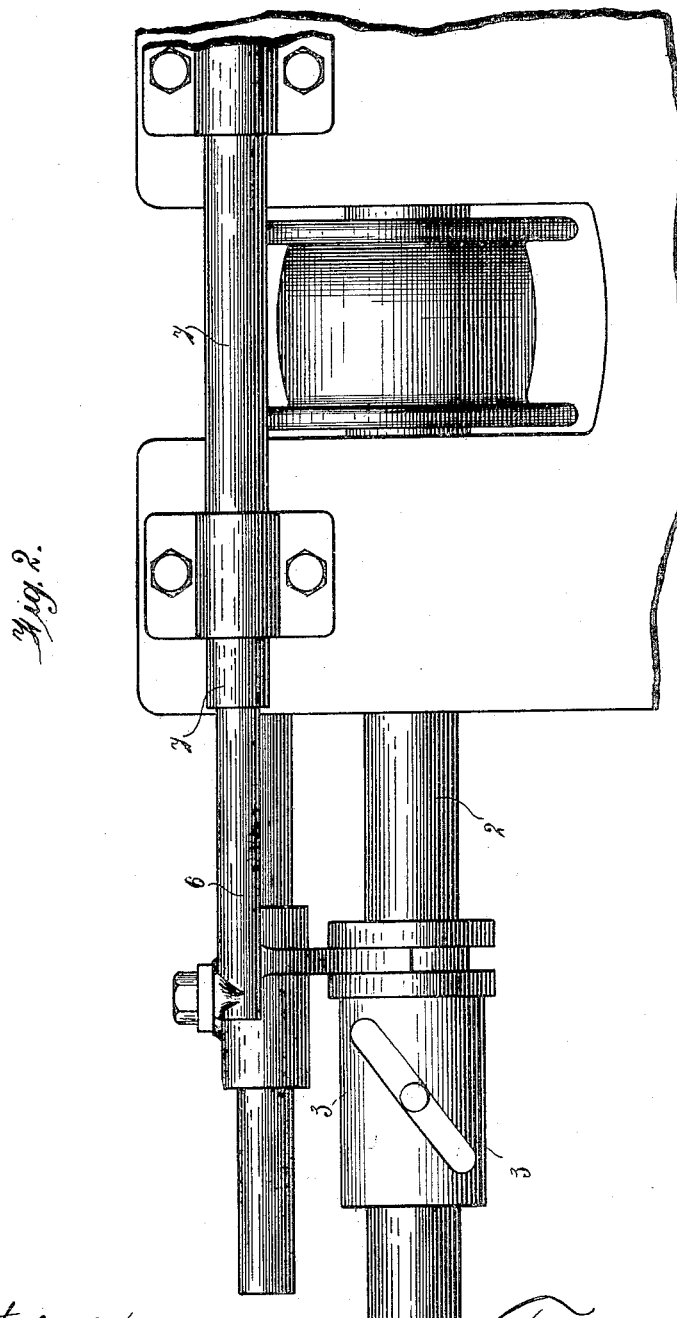

F. W. GARRETT.
CHUCKING MECHANISM FOR MACHINE TOOLS.
APPLICATION FILED APR. 8, 1914.
1,124,008.
Patented Jan. 5, 1915.
3 SHEETS—SHEET 3.
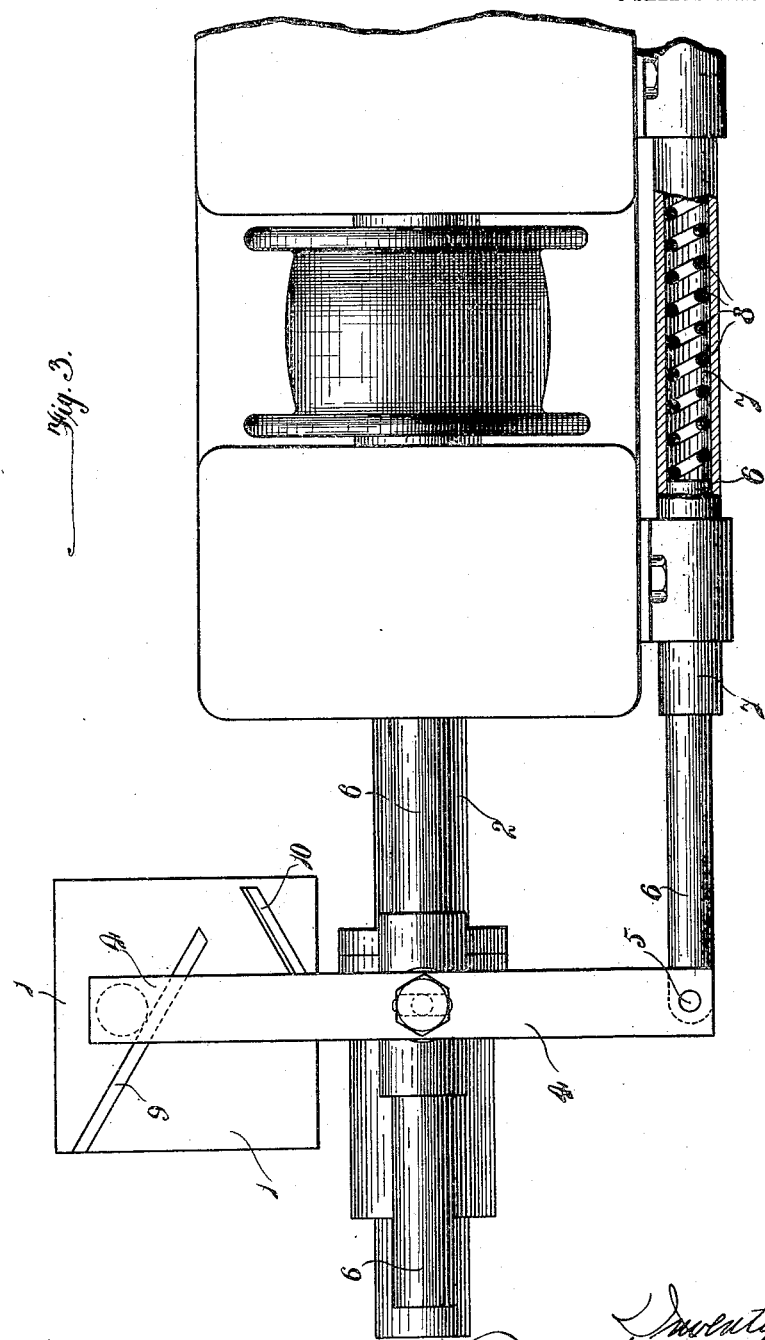

UNITED STATES PATENT OFFICE.

FREDERICK WILLIAM GARRETT, OF BIRMINGHAM, ENGLAND, ASSIGNOR TO EDWIN NEWEY, OF BIRMINGHAM, ENGLAND.

CHUCKING MECHANISM FOR MACHINE-TOOLS.

1,124,008.

Specification of Letters Patent.

Patented Jan. 5, 1915.

Application filed April 8, 1914. Serial No. 830,558.

*To all whom it may concern:*

Be it known that I, FREDERICK WILLIAM GARRETT, subject of the King of Great Britain, residing at 38 Leslie road, Edgbaston, Birmingham, county of Warwick, England, have invented certain new and useful Improvements in Chucking Mechanism for Machine-Tools; and I do hereby declare that the following is a full, clear, and exact description of the same.

My invention comprises improvements in chucking mechanism for machine tools, and refers more particularly to that class of such chucking mechanism as is employed upon capstan lathes or the like, and which embodies a collet located at the front end of the spindle, through which the bar stock is passed, the collet being closed through the medium of a sleeve passing through the spindle, and being adapted to be moved longitudinally by suitable mechanism located at the rear end of the spindle.

In the prior Patent No. 925,149 dated 15th of March 1910, one form of such chucking mechanism is shown, which comprises an axially movable sleeve, having helical slots or grooves, which impart a rotary movement to a cam member, whereby the collet actuating sleeve is moved longitudinally, but the present invention is applicable to other forms of chucking mechanism in addition to that described in the prior specification, whether the collet is closed by pushing it forwardly or pulling it rearwardly. Chucking mechanism of this kind has usually been hand-actuated, which readily permits of its use with equal efficiency upon bar stock of slightly varying diameter, the movement of the controlling hand being limited by the diameter of the bar stock. The object of the present invention is to adapt this type of chucking mechanism to automatic lathes or the like, in which the control is effected by a cam or cams instead of by hand, for the existing types of this chucking mechanism are inapplicable for use with automatic machines, as the controlling cam gives a definite closing movement to the collet, and as the diameter of the bar stock may vary slightly it is necessary for the closure of the collet to automatically compensate for these slight variations in order that an effective grip may be obtained upon bar stock of slightly varying diameter, without risk of the mechanism being injured.

According to this invention, the connection between the cam and the actuating sleeve is resilient, so as to permit of a slight lost movement being given in the case of bar stock which exceeds the diameter for which the machine is set.

In order that my invention may be clearly understood and more readily carried into practice, I have appended hereunto three sheets of drawings illustrating the same wherein:—

Figure 1 is a longitudinal section of a lathe spindle with my automatic chucking mechanism applied thereto. Fig. 2 is an elevation of the automatic control member. Fig. 3 is a plan of same. Fig. 4 is a perspective view of the rear end of the fixed cam member. Fig. 5 is a perspective view of the rotating cam member.

In carrying my invention into practice as illustrated on the accompanying drawings, the cam drum 1 is either behind or beneath the work spindle 2 the connection to the actuating helically-grooved sleeve 3 of the kind described in the prior specification, being through the medium of a pivoted lever 4 the fulcrum 5 of which extends beyond the point at which the lever is connected to the said sleeve. This end of the lever is conveniently connected to a spring plunger 6 disposed in the direction of the movement of the said lever, this plunger entering a socket 7 secured to a fixed part of the machine, and containing a spring 8 normally pressing the plunger outward.

The cam drum has straps 9, 10, serving to both open and close the collet 11 at the desired moment, and it will be obvious that when the lever is shifted the helically-grooved sleeve, 3 will rotate the member 13, having inclines 14, which longitudinally moves the sleeve, which is connected to and in a similar manner to that described in the aforementioned prior specification No. 952,149. These inclines 14 on the member 13 bear against inclines 15 on a fixed member 16. Therefore the rotation of the member 13 moves it endwise taking with it the sleeve 17 which controls the collet, the part 13 being connected to the sleeve 17 by the nuts 18 and ball bearings 19 though free to rotate relatively thereto. Thus, when the part 13 rotates, the sleeve moves endwise driving the collet into the tapered member 16 and thus closing the collet upon the work.

The amount of movement is obviously controlled by the cams. The machine may be set so as to effect proper grip on bar stock of minimum size, the strength of the spring at the fulcrum being such as to permit effective grip, but immediately this is completed the fulcrum gives away allowing a slight lost movement to take place as the cam is completing the movement of the lever.

The invention may be applied to automatic machines with one or more spindles as desired.

What I claim is:—

1. In chucking mechanism for machine tools the combination of a work spindle: a collet located at the end of the work spindle and adapted to grip the bar stock when said collet is moved longitudinally: a longitudinally movable sleeve located within the work spindle and being connected to and controlling the collet; a rotary cam drum; a lever intermediate between said cam drum and longitudinally movable sleeve: and a spring supported plunger forming the fulcrum for said lever and serving to compensate for variations in the diameter of the bar stock.

2. In chucking mechanism for machine tools, the combination of a work spindle; a collet located at the end of the work spindle and adapted to grip the bar stock when said collet is moved longitudinally; a sleeve located within the work spindle and being connected to and controlling the collet; an inclined member at the rear of said sleeve; a rotary member having inclines co-acting with said inclined member; a longitudinally movable sleeve having helical grooves co-acting with said rotary member and serving to rotate said member when said helically-grooved sleeve is moved longitudinally, a rotary cam drum; a lever connecting said cam drum to said helically-grooved sleeve: and a spring supported plunger forming the fulcrum for the said lever and serving to compensate for variations in the diameter of the bar stock.

In testimony whereof I affix my signature in presence of two witnesses.

FREDERICK WILLIAM GARRETT.

Witnesses:
HAROLD C. FORRESTER,
HERBERT J. O. BARTON.